Patented Sept. 14, 1948

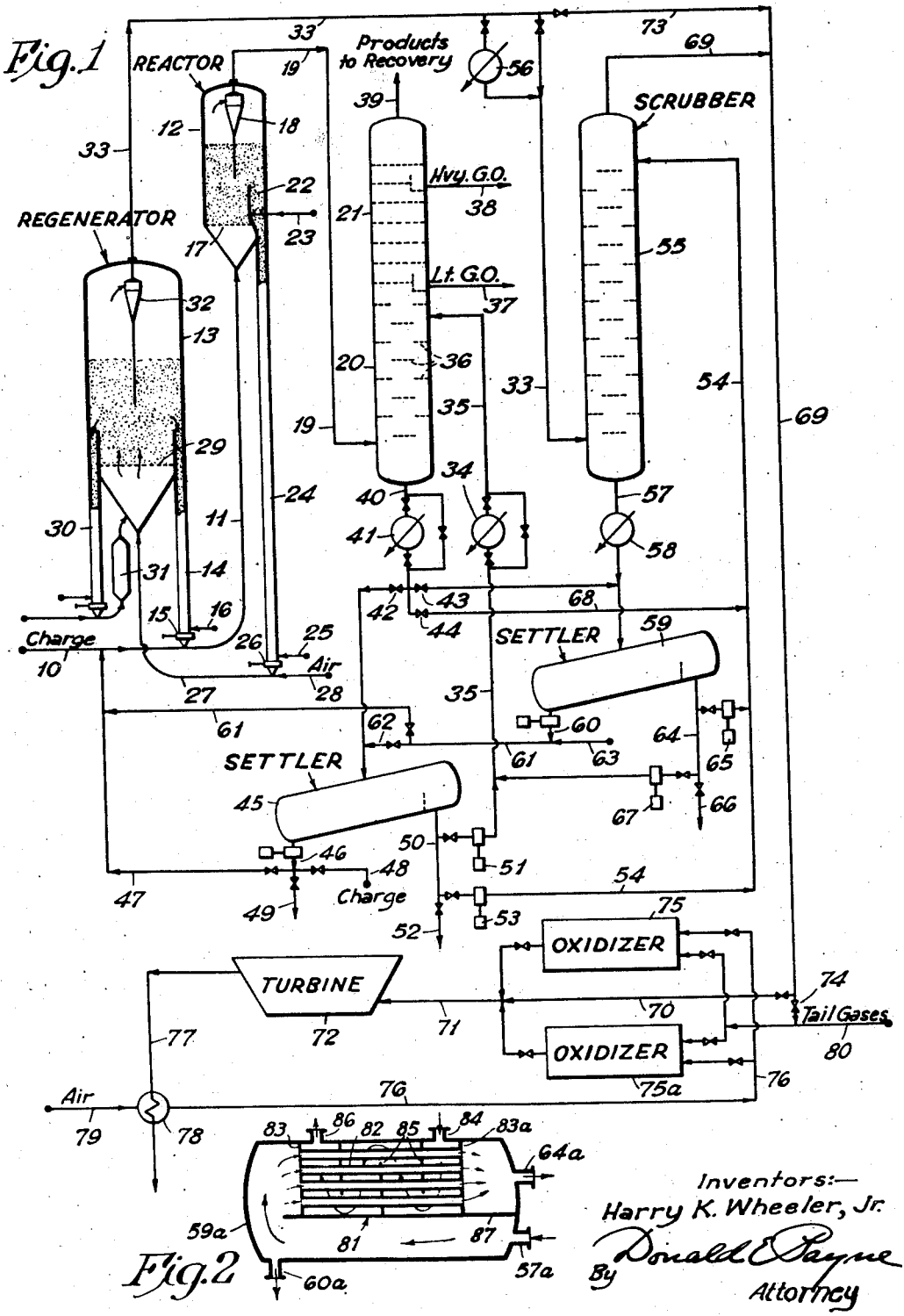

2,449,096

UNITED STATES PATENT OFFICE 2,449,096

POWER RECOVERY FROM CATALYTIC CONVERSION SYSTEMS EMPLOYING FLUIDIZED SOLIDS

Harry K. Wheeler, Jr., Chicago, Ill., assignor to Standard Oil Company, Chicago, Ill., a corporation of Indiana Original application March 29, 1945, Serial No. 585,490. Divided and this application January 15, 1948, Serial No. 2,434

4 Claims. (Cl. 196—52)

1

This invention relates to catalytic conversion systems employing fluidized solids and it pertains more particularly to improved methods and means for recovering catalyst solids from gasiform streams and for more effectively utilizing the potential energy of said streams. This is a division of a copending application Serial 585,490 filed jointly with Robert J. Hengstebeck on March 29, 1945, wherein improvements in solids separation are claimed. The claims in this case are directed to a combination of steps which include removal of solids from hot regeneration gases and the subsequent utilization of the hot gases, which may have their energy content even further enhanced, for supplying motive power.

The invention is applicable to any catalytic conversion system wherein solid catalyst material of small particle size is handled as a fluidized mass and continuously cycled from a conversion zone to a regeneration zone and thence back to the conversion zone. In such a system certain amounts of finely divided solids are unavoidably carried overhead with effluent gasiform streams from the reaction zone and the regeneration zone respectively. An object of the invention is to provide improved methods and means for recovering such solids from such streams at minimum expense and with maximum utilization of the potential energy of said streams and maximum conservation of valuable charging stock and product components.

In catalytic cracking systems employing fluidized solids as catalyst materials it has been the practice to recover solids from the effluent product stream in a scrubbing zone which forms the lower part of an initial fractionating zone, a portion of the solids-containing bottoms from the scrubbing zone being recycled through a cooler to the upper part of the scrubbing zone above the hot product inlet. An object of the invention is to avoid the recycle of solids-containing liquids and to employ a substantially solids-free oil as a cooling and scrubbing agent in the scrubbing zone or zones.

That portion of the solids-containing liquid which has been withdrawn from the base of the scrubbing zone has heretofore been returned with charging stock to the catalytic cracking conversion zone. It was found however that the return of this material leads to the deposition of unduly large amounts of coke on the catalyst in the conversion zone and that the best practice is to settle these solids from the withdrawn solids-containing liquid and to avoid the return of the bulk of the liquid to the conversion zone. An object of the invention is to improve the process of returning

2 spent catalyst by providing improved methods and means for washing and displacing coke-forming oil from the settled catalyst particles and returning said particles in heavy virgin oil suspension with no substantial amounts of heavy cracked materials.

It has been found that catalyst particles may be recovered from regeneration gases by counter-current scrubbing with at least a portion of the feed stock (U. S. Patents 2,273,075-6). In such a process however a certain amount of the valuable feed stock is lost by vaporization and there is a tendency toward oxidation of valuable charge components by residual oxygen in the regeneration gas. An object of the invention is to provide an improved method and means for recovering solids from regeneration gases and for avoiding the necessity of any contacting of hot regeneration gases with incoming charging stock. A further object is to accomplish the removal of solids from regeneration gases with minimum capital investment and minimum operating costs.

An important object of the invention is to utilize the potential energy of gaseous streams from fluidized solids systems more effectively than such potential energy has heretofore been utilized. A further object is to provide a method and means for enhancing the potential energy content of a regeneration gas stream simultaneously with the removal of solids therefrom and for subsequently recovering at least a substantial portion of the enhanced energy content thereof. Other objects will be apparent as the detailed description of the invention proceeds.

The invention will be described as applied to the catalytic cracking of gas oils or reduced crudes to produce motor fuel but it should be understood that the invention is also applicable to other hydrocarbon conversion processes such as retreating, reforming, hydroforming, aromatization, hydrogenation, dehydrogenation, desulfurization, etc., and in fact to fluidized solids conversion processes generally.

The invention contemplates the addition to present fluid-type catalytic cracking systems of one or more settlers, a regeneration gas scrubber, and optional oxidizer, a turbine or other power-developing means, and pumps, lines and heat exchangers arranged and operated to provide a markedly improved catalyst and energy recovery system. Instead of scrubbing regeneration gas with incoming charge or a portion thereof I employ as a scrubbing medium the low grade residual product fraction preferably after a substantial amount of its heat has been utilized for generating steam or preheating incoming charging stock. The scrubbing oil for both the product streams and the regeneration gas streams may be substantially free from solids thus improving the solids separation step as well as minimizing erosion on transfer lines, pipes, heat exchangers, etc. The residual product oil which serves as a scrubbing oil for catalyst removal is not only effectively kept out of the charge stream but it is utilized for recovering catalyst from regeneration gases and enriching said regeneration gases to form a hot combustible stream which may be burned with preheated air to supply motive power for a turbine or other industrial use.

The invention will be more clearly understood from the following detailed description of a specific example and from the accompanying drawings which form a part of this specification and in which:

Figure 1 is a schematic flow diagram of the improved catalyst and power recovery system and, Figure 2 is a vertical section through the combined settler-steam generator.

Referring to Figure 1, a charging stock such, for example as a gas oil or reduced crude, is introduced through line 10 and transfer line 11 to the base of reactor 12. Hot regenerated catalyst from regenerator 13 is introduced by standpipe 14 into transfer line 11 in amounts sufficient to effect the desired conversion and to supply at least a considerable portion of the heat required therefor. The catalyst may be of the natural or synthetic silica-alumina type or of any other known type and should preferably have a particle size chiefly within the range of 10 to 100 microns. Spherical catalyst particles are particularly advantageous.

The regenerator in this case may operate at a temperature in the approximate range of 950 to 1100° F., e. g. about 1000°–1050° F., so that if sufficiently large catalyst-to-oil ratios are employed, the contained heat of the catalyst may supply not only the heat of conversion but all or a substantial part of the heat of vaporization of the charging stock. The charging stock may however be suitably preheated and if desired it may be vaporized and preheated to substantially conversion temperature before it picks up the catalyst from the base of standpipe 14. The flow of catalyst through standpipe 14 may be regulated by valve 15 and the catalyst in the standpipe may be maintained in aerated liquid-like condition by the introduction of aeration gas through line 16.

The suspension of regenerated catalyst in incoming charging stock is distributed in reactor 12 by means of grid 17 and a vertical gas or vapor velocity in the reactor is maintained in the approximate range of about 1 to 3 feet per second so that a suspended dense turbulent phase of catalyst is maintained in the reactor, which dense phase is superimposed by a light dispersed phase. Catalyst may be knocked back from the light phase to the dense phase by means of cyclone separators 18 or other known means, the gasiform product being withdrawn overhead through line 19 to the base of scrubber 20 which forms the lower part of fractionating tower 21. Reactor 12 may be operated under any desired conversion conditions, conversion temperatures usually being within the approximate range of 800 to 1000° F. for example about 925° F. and the pressure being within the approximate range of about atmospheric to about 10 atmospheres. The weight ratio of catalyst-to-oil in the suspension introduced into the reactor may be within the approximate range of 1:1 to 30:1, the residence time of the catalyst in the reactor may be within the approximate range of about 2 to 200 minutes and the weight space velocity will be within the approximate range of .2 to 20 pounds of charging stock introduced per hour per pound of catalyst maintained in the reactor.

Catalyst is withdrawn directly from the dense phase in reactor 12 into stripping zone 22 wherein it is stripped with steam or other stripping gas introduced through line 23. The stripped catalyst passes downwardly in standpipe 24, is maintained in fluent liquid-like form therein by aeration gas introduced through line 25 and is dispersed from the base of the standpipe through valve 26 into conduit 27 wherein the catalyst is suspended in air introduced from line 28 and the suspension is carried to the base of regenerator 13.

The suspension is distributed in regenerator 13 by means of grid 29 and upflowing gas velocities of about 1 to 3 feet per second are employed to maintain the catalyst in the regenerator as a suspended dense turbulent phase superimposed by a light dispersed phase. A portion of the dense phase catalyst may be recycled through standpipe 30 and cooler 31 to maintain regeneration temperature within desired limits. Cyclone separators 32 or other suitable means may be employed to knock back catalyst from the dilute phase to the dense phase. Hot regeneration gases are removed from the regenerator by line 33. The system thus far described is conventional fluid type catalytic cracking. My invention is not limited to this particular system but is applicable to any fluidized solids conversion system that presents the problem of recovery solids and heat or energy from effluent gasiform streams. More detailed descriptions of such systems and of the catalyst conditions employed therein are set forth in U. S. Patents 2,337,684 and 2,341,193 and in numerous copending applications.

For recovering solids from a product stream a substantially solids-free non-volatile oil may be cooled in heat exchanger 34 (although such cooling, i. e. the use of such heat exchanger is not always necessary) and introduced through line 35 at the upper part of scrubber 20 which may be provided with suitable baffles 36. Oil introduced through line 35 effects the condensation of the highest boiling components of the product stream and simultaneously scrubs the solids out of said stream. Components of the gas oil boiling range together with lower boiling components pass upwardly from the scrubbing section 20 to the rectifying or fractionating portion of tower 21 from which a heavy gas oil stream may be withdrawn through line 37 and a light gas oil stream through line 38. Gasoline boiling range components, steam and normally gaseous materials are taken overhead through line 39 for fractionation and recovery in the usual manner.

The hot scrubbing oil, condensate, and suspended solids are withdrawn from the base of scrubber 20 through line 40. A heat exchanger for incoming charging stock or waste heat boiler 41 may be employed for cooling the withdrawn liquid to a temperature of the order of 300 to 600° F. although as described in connection with Figure 2, such cooling may be effected in the settling zone after solids have been separated from the liquids. With valve 42 open, valves 43 and 44 closed, the slurry of recovered catalyst solids may be introduced into settling chamber 45. Settled solids may be withdrawn from the inclined bottom of the settling chamber as a thickened slurry through conduit 46 and returned through line 47 to charging stock inlet line 10. A portion of the charging stock may be introduced through line 48 for facilitating transfer of the solids. If desired the slurry from line 46 may be introduced by line 49 to a washing zone along with a relatively clean non-coke-forming oil and the catalyst may be settled from such relatively clean oil before recycle in order to eliminate more completely the return of coke-forming oil with recycled catalyst.

Substantially solids-free oil is withdrawn from settler 45 by line 50 and at least a substantial part of this withdrawn oil is introduced by pump 51 and line 35 back to the upper part of scrubbing zone 20. The remainder of the solids-free oil may be withdrawn from the system through line 52 and it is preferably introduced by pump 53 and line 54 to the upper part of scrubber 55 which may be provided with suitable baffles or other means for securing effective gas-liquid contact. Regeneration gas from line 33 is introduced at the base of scrubber 55. When the potential energy in the regeneration gas stream is to be utilized for driving a turbine this stream may be introduced at the base of scrubber 55 directly from the top of the regenerator and without any appreciable cooling. However, I may employ a waste heat boiler 56 and I may by-pass all or a sufficient part of the regeneration gas through said waste heat boiler, materially reduce the temperature of gases entering scrubber 55 and generate high pressure steam. The temperature of the gases entering the base of scrubber 55 is preferably within the range of about 600 to 1200° F. and for example may be about 900° F. to 1000° F. A sufficient amount of oil is introduced through line 54 to scrub out substantially all of the residual solids contained in the regeneration gases.

The scrubbing liquid with accumulated solids is withdrawn through line 57 and heat exchanger or waste heat boiler 58 to settler 59 although here again the waste heat boiler may be built into the settler itself as described in connection with Figure 2. The settled catalyst solids are withdrawn from the settler through conduit 60 and may be returned by lines 61 and 47 to line 10 or introduced by lines 61 and 62 to settler 45. Alternatively these solids may be washed in a separate washing zone before recycling. Relatively clean non-coke-forming oil, or a portion of the charging stock, or oil from line 52 may be introduced through line 63 to facilitate the handling and/or washing of the solids.

A portion of the solids-free oil withdrawn from settler 59 through line 64 may be recycled by pump 65 and line 54 to scrubber 55, the net production of highly refractory oil being withdrawn through line 66.

By providing separate settlers 45 and 59 for scrubbers 20 and 55 respectively in the manner hereinabove described the product stream is not contaminated by oils which have been contacted and perhaps partially oxidized with the regeneration gas stream. However, when such oxidation presents no problem I may dispense entirely with settler 45 and pass the solids-containing oil from line 40 through valve 43 into settler 59. In this case a portion of the clear oil from line 64 is returned by pump 67 to line 35 for recycle through cooler 34 to the upper part of scrubber 20. I may pass the solids-containing liquid from line 40 through valve 44 and lines 68 and 54 directly to the upper part of scrubber 55 but such alternative is open to the objection that the oil introduced at the top of scrubber 55 would contain solids. In the preferred method of operation the scrubbing oil is substantially freed from solids and hence is more efficient for removing solids and less likely to cause erosion, line plugging, etc.

The hot regeneration gases leaving the top of scrubber 55 may be introduced by lines 69, 70 and 71 directly to turbine 72 for generating electrical energy, driving air compressors or otherwise utilizing potential energy of this gas stream. The removal of solids in scrubber 55 prevents the erosion of turbine blades and parts.

When spherical catalyst particles are employed and such particles are substantially quantitatively removed from generation gases by cyclones 32 or other separation means the use of scrubber 55 may be unnecessary and the hot regeneration gases may be introduced directly to the turbine through lines 33, 73, 69, 70 and 71.

When scrubber 55 is employed and operated at a high temperature upwards for example of 900° F., part of the oil introduced through line 54 will be vaporized and carried along with the gases leaving the scrubber through line 69. To utilize the potential energy of this gas stream I may pass it through line 74 through one of the oxidizing chambers 75 and 75a (into which an air stream can be introduced through line 76 if additional oxygen is necessary) for effecting combustion of the hydrocarbon vapors in the gas stream that were picked up in the scrubber and for materially increasing the temperature of the gases introduced through line 71 to turbine 72. The off gases from the turbine may be passed through line 77 through exchanger 78 and the incoming air stream from line 79 may be passed through this exchanger in order to preheat the air introduced through line 76 to the oxidizing chambers. Oxidizing chamber 75 may be open vessels of the type commonly known as flue gas generators or they may be packed with any known type of oxidation catalyst material for insuring substantially complete combustion. In the manner above described I may materially augment the potential energy available for utilization by the turbine. The energy of the stream may be further augmented by the introduction of tail gases from the product recovery system through line 80 with a corresponding increase in the amount of air introduced through line 76.

By operating the entire system at superatmospheric pressure I can greatly increase the amount of power obtainable from the regeneration gases by the turbine and at the same time effect savings in equipment costs by employing a smaller reactor, regenerator, etc. The catalyst recovery system is just as efficient at low pressures as at high pressures and may be employed very advantageously in systems wherein the top pressure in the reactor is of the order of 5 to 10 pounds per square inch (gauge pressure). Regenerator pressure is closely tied to reactor pressure because of the fluids flow system between reactor and regenerator. However, by placing the reactor at a considerably higher level than the regenerator, the top pressure in the regenerator may be 2 to 10 pounds or more higher than the top pressure in the reactor and such an arrangement is desirable for maximum utilization of the potential energy content of the regeneration gases.

As hereinabove stated, I may employ a unitary settler-waste heat boiler assembly as illustrated in Figure 2. In such an assembly the settler 59a may be provided with an upper waste heat boiler section 81 comprising a bundle of tubes 82 secured in headers 83 and 83a. Water enters the upper boiler section through conduit 84 and this section may be provided with staggered baffles 85 between the water inlet and steam outlet 86. The incoming slurry from line 57a passes under the boiler section and is prevented from short circuiting the boiler by extensions 87 of the boiler walls which are secured to the end wall of settler 59a. Solids settle out of the slurry in the lower part of settler 59a where the temperature of the oil is highest and its viscosity is therefore at a minimum. The solids-free oil then passes through tubes 82 of the waste heat boiler for generating steam which may be employed as process steam in the system or for supplying heat or for driving compressors or generators. Catalyst solids are removed through conduits 60a and the clear cooled oil streams are withdrawn through lines 64a. Instead of generating steam in section 81 I may use it to preheat incoming charging stock or for heating any other fluids.

While I have disclosed a specific system for recovering solids and energy from gasiform solids leaving the fluidized solids treating system it should be understood that the invention is not limited to the specific arrangements or detailed operations hereinabove set forth since various alternative arrangements and operating conditions will be apparent from the above description to those skilled in the art.

I claim:

1. In a catalytic conversion system wherein solid catalyst material of small particle size is handled as a fluidized mass and continuously cycled from a conversion zone to a regeneration zone and thence back to a conversion zone and wherein a hot regeneration gas stream containing residual solid particles is discharged from the regeneration zone at superatmospheric pressure, the method of operation which comprises scrubbing said residual solids from said stream with a hot non-volatile hydrocarbon liquid in a scrubbing zone which is at a temperature of at least about 900° F. whereby solids are removed from said stream without cooling it below such temperature and impelling a generator of motive power with said stream from which residual solids have thus been removed.

2. In a catalytic conversion system wherein solid catalyst material of small particle size is handled as a fluidized mass and continuously cycled from a conversion zone to a regeneration zone and thence back to a conversion zone and wherein a hot regeneration gas stream containing residual solid particles is discharged from the regeneration zone at superatmospheric pressure, the method of operation which comprises scrubbing said stream with a high boiling hydrocarbon oil in a scrubbing zone which is at a temperature of at least about 900° F. under conditions for effecting removal of residual solids from the stream and enrichment of said stream with hydrocarbon vapors, effecting combustion of said hydrocarbon vapors in said stream to increase the temperature thereof and impelling a generator of motive power with said stream from which said solids have been removed and the temperature of which has thus been increased by said combustion.

3. In a catalytic conversion system wherein solid catalyst material of small particle size is handled as a fluidized mass and continuously cycled from a conversion zone to a regeneration zone and thence back to the conversion zone and wherein a hot regeneration gas stream containing residual solid particles is discharged from the regeneration zone at superatmospheric pressure and at a temperature higher than 900° F., the method of operation which comprises separating from products leaving the conversion zone a residual fraction comprising the highest boiling hydrocarbon product components, scrubbing said residual solid particles from said hot regeneration gas stream with said residual fraction in a scrubbing zone at a temperature of about 900° F. whereby solids are removed from said stream at said temperature and impelling a generator of motive power with said hot stream from which residual solids have thus been removed.

4. The method of claim 3 which includes the step of effecting combustion of hydrocarbon vapors which become associated with said stream in the scrubbing step before impelling such generator of motive power with said stream.

HARRY K. WHEELER, JR.

REFERENCES CITED

The following references are of record in the file of this patent:

UNITED STATES PATENTS

| Number | Name | Date |
| --- | --- | --- |
| 2,266,095 | Thayer | Dec. 16, 1941 |
| 2,307,672 | Dunham | Jan. 5, 1943 |
| 2,404,071 | Jahnig | July 16, 1946 |